(12) United States Patent
Ide et al.

(10) Patent No.: US 10,214,672 B2
(45) Date of Patent: Feb. 26, 2019

(54) HEAT-STORAGE MATERIAL, AND HEAT-STORAGE MEMBER, STORAGE CONTAINER, TRANSPORTATION/STORAGE CONTAINER, CONSTRUCTION MATERIAL, AND ARCHITECTURAL STRUCTURE USING THE SAME

(71) Applicant: Sharp Kabushiki Kaisha, Osaka-shi, Osaka (JP)

(72) Inventors: Tetsuya Ide, Osaka (JP); Yuka Utsumi, Osaka (JP); Daiji Sawada, Osaka (JP); Hisanori Bessho, Osaka (JP); Takashi Yamashita, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/039,091

(22) PCT Filed: Nov. 7, 2014

(86) PCT No.: PCT/JP2014/079605
§ 371 (c)(1),
(2) Date: May 25, 2016

(87) PCT Pub. No.: WO2015/079891
PCT Pub. Date: Jun. 4, 2015

(65) Prior Publication Data
US 2017/0226394 A1    Aug. 10, 2017

(30) Foreign Application Priority Data
Nov. 26, 2013 (JP) .................................. 2013-244049

(51) Int. Cl.
*F28D 17/00*    (2006.01)
*C09K 5/06*    (2006.01)
(Continued)

(52) U.S. Cl.
CPC .............. *C09K 5/063* (2013.01); *B65D 81/18* (2013.01); *E04B 1/7608* (2013.01); *F28D 20/02* (2013.01);
(Continued)

(58) Field of Classification Search
CPC ....... C09K 5/063; B65D 81/18; E04B 1/7608; F28D 20/02
(Continued)

(56) References Cited

U.S. PATENT DOCUMENTS

| 6,757,486 B2 * | 6/2004 | Hirano | F24H 7/002 165/10 |
| 7,875,749 B2 | 1/2011 | Tomura et al. | |

(Continued)

FOREIGN PATENT DOCUMENTS

| JP | 002800039 B2 * | 9/1998 |
| JP | 2008-214527 A | 9/2008 |

*Primary Examiner* — Davis D Hwu
(74) *Attorney, Agent, or Firm* — Keating & Bennett, LLP

(57) ABSTRACT

The invention aims to provide a heat-storage material which can prevent supercooling.

The heat-storage material according to the invention includes: a heat-storage substance which reversibly changes between an aqueous solution containing tetraalkylammonium salt and a clathrate hydrate containing the tetraalkylammonium salt as a guest molecule; and alum which is added to the aqueous solution containing tetraalkylammonium salt. Tetrabutylammonium bromide is used as the tetraalkylammonium salt. Potassium alum or ammonium alum is used as the alum.

14 Claims, 11 Drawing Sheets

(51) Int. Cl.
 *B65D 81/18* (2006.01)
 *E04B 1/76* (2006.01)
 *F28D 20/02* (2006.01)
 *B65D 81/38* (2006.01)

(52) U.S. Cl.
 CPC ......... *B65D 81/3823* (2013.01); *Y02E 60/145* (2013.01)

(58) Field of Classification Search
 USPC .......................................................... 165/10
 See application file for complete search history.

(56) References Cited

U.S. PATENT DOCUMENTS

2010/0004487 A1    1/2010  Tomura et al.
2010/0133464 A1*   6/2010  Tomura ................. C09K 5/063
                                                   252/70
2012/0168126 A1*   7/2012  Tanaka ................. F28D 20/025
                                                   165/104.11

* cited by examiner

FIG. 1

| HEAT-STORAGE SUBSTANCE | MOLECULAR WEIGHT | MELTING POINT (°C) | LATTICE CONSTANT [Å] | AQUEOUS SOLUBILITY [wt%] (15°C) | AQUEOUS SOLUBILITY [wt%] (30°C) | AQUEOUS SOLUBILITY [M] (15°C) | AQUEOUS SOLUBILITY [M] (30°C) |
|---|---|---|---|---|---|---|---|
| TBAB | 322.37 | 103 | a = b = 23.65  c = 12.5 | 60 | 60 | 1.86122 | 1.86122 |

FIG. 2

| CANDIDATES FOR SUPERCOOLING PREVENTING AGENT | MOLECULAR WEIGHT | MELTING POINT (°C) | LATTICE CONSTANT [Å] | AQUEOUS SOLUBILITY [wt%] (15°C) | AQUEOUS SOLUBILITY [wt%] (30°C) | AQUEOUS SOLUBILITY [M] (15°C) | AQUEOUS SOLUBILITY [M] (30°C) |
|---|---|---|---|---|---|---|---|
| AMMONIUM ALUM DODECAHYDRATE | 453.33 | 94 | a = b = c = 12.24 | 14.8 | 28.5 | 0.32647 | 0.62868 |
| POTASSIUM ALUM DODECAHYDRATE | 474.39 | 92 | a = b = c = 12.158 | 9.2 | 15.4 | 0.19393 | 0.32643 |
| SODIUM TETRABORATE DECAHYDRATE | 381.37 | 62 | a = 11.885  b = 10.654<br>c = 12.206  α = 90°<br>β = 106.623°  γ = 90° | 3.79 | 7.2 | 0.09938 | 0.18879 |
| DISODIUM HYDROGEN PHOSPHATE DODECAHYDRATE | 358.14 | 35.2, 48.3, 92.5 (TO LOW-ORDER HYDRATE DUE TO NON-HARMONIC MELTING) | a = 14.178  b = 9.021<br>c = 12.771  α = 90°<br>β = 108.88°  γ = 90° | 7.2 | 72 | 0.20104 | 2.01039 |
| SODIUM SULFATE DECAHYDRATE | 322.19 | 32.5 (TO ANHYDRIDE DUE TO NON-HARMONIC MELTING) | a = 11.512  b = 10.370<br>c = 12.847  α = 90°<br>β = 107.789°  γ = 90° | 15 | 40 | 0.46556 | 1.24150 |

FIG. 3

| SUPERCOOLING PREVENTING AGENT | FIRST TIME | SECOND TIME | THIRD TIME |
|---|---|---|---|
| AMMONIUM ALUM DODECAHYDRATE: 2.0 wt% (TBAB: 25.3 wt%) | × | × | × |
| AMMONIUM ALUM DODECAHYDRATE: 2.5 wt% (TBAB: 25.1 wt%) | × | × | × |
| AMMONIUM ALUM DODECAHYDRATE: 3.0 wt% (TBAB: 25.0 wt%) | × | ○ | × |
| AMMONIUM ALUM DODECAHYDRATE: 4.0 wt% (TBAB: 24.8 wt%) | ○ | ○ | ○ |
| POTASSIUM ALUM DODECAHYDRATE: 2.0 wt% (TBAB: 25.3 wt%) | ○ | × | ○ |
| POTASSIUM ALUM DODECAHYDRATE: 2.5 wt% (TBAB: 25.1 wt%) | ○ | ○ | ○ |
| POTASSIUM ALUM DODECAHYDRATE: 3.0 wt% (TBAB: 25.0 wt%) | ○ | ○ | ○ |
| POTASSIUM ALUM DODECAHYDRATE: 4.0 wt% (TBAB: 24.8 wt%) | ○ | ○ | ○ |

| SUPERCOOLING PREVENTING AGENT | FIRST TIME | SECOND TIME | THIRD TIME |
|---|---|---|---|
| SODIUM TETRABORATE DECAHYDRATE: 3.0 wt% (TBAB: 25.0 wt%) | ○ | ○ | ○ |

FIG. 7

| SUPERCOOLING PREVENTING AGENT | SUPERCOOLING PREVENTION EFFECT |
|---|---|
| AMMONIUM ALUM DODECAHYDRATE: 2.0 wt% + 2-PROPANOL: 1.5 wt% (TBAB: 24.9 wt%) | ○ |
| AMMONIUM ALUM DODECAHYDRATE: 2.0 wt% + 2-PROPANOL: 3.0 wt% (TBAB: 24.5 wt%) | ○ |
| AMMONIUM ALUM DODECAHYDRATE: 3.0 wt% + 2-PROPANOL: 1.5 wt% (TBAB: 24.6 wt%) | ○ |
| AMMONIUM ALUM DODECAHYDRATE: 3.0 wt% + 2-PROPANOL: 3.0 wt% (TBAB: 24.3 wt%) | ○ |

FIG. 8

| SUPERCOOLING PREVENTING AGENT | pH | SUPERCOOLING PREVENTION EFFECT |
|---|---|---|
| NONE | 8 TO 9 | × |
| SODIUM TETRABORATE PENTAHYDRATE: 3.0 wt% | 10 | ○ |
| POTASSIUM ALUM DODECAHYDRATE: 3.0 wt% | 6 | ○ |
| AMMONIUM ALUM DODECAHYDRATE: 3.0 wt% | 6 | △ (○ BY ADDITION OF 2-PROPANOL) |
| ALUMINUM HYDROXIDE: 3.0 wt% | 7 | × |
| SODIUM SULFATE DECAHYDRATE: 3.0 wt% | 7 TO 8 | × |
| BORIC ACID: 3.0 wt% | 6 | × |

FIG. 9

| ADDITIVE | LATTICE CONSTANT [Å] | CRYSTAL SYSTEM |
|---|---|---|
| POTASSIUM ALUM DODECAHYDRATE (ALUMINUM POTASSIUM SULFATE) | $a = b = c = 12.16$ | CUBIC |
| AMMONIUM ALUM DODECAHYDRATE (ALUMINIUM AMMONIUM SULFATE) | $a = b = c = 12.24$ | CUBIC |
| ALUMINUM SULFATE | $a = 8.025$<br>$b = 8.025$<br>$c = 21.36$ | RHOMBUS |
| POTASSIUM SULFATE | $a = 5.772$<br>$b = 10.07$<br>$c = 7.483$ | ORTHORHOMBUS |
| AMMONIUM SULFATE | $a = 7.730$<br>$b = 10.50$<br>$c = 5.950$ | ORTHORHOMBUS |

FIG. 11
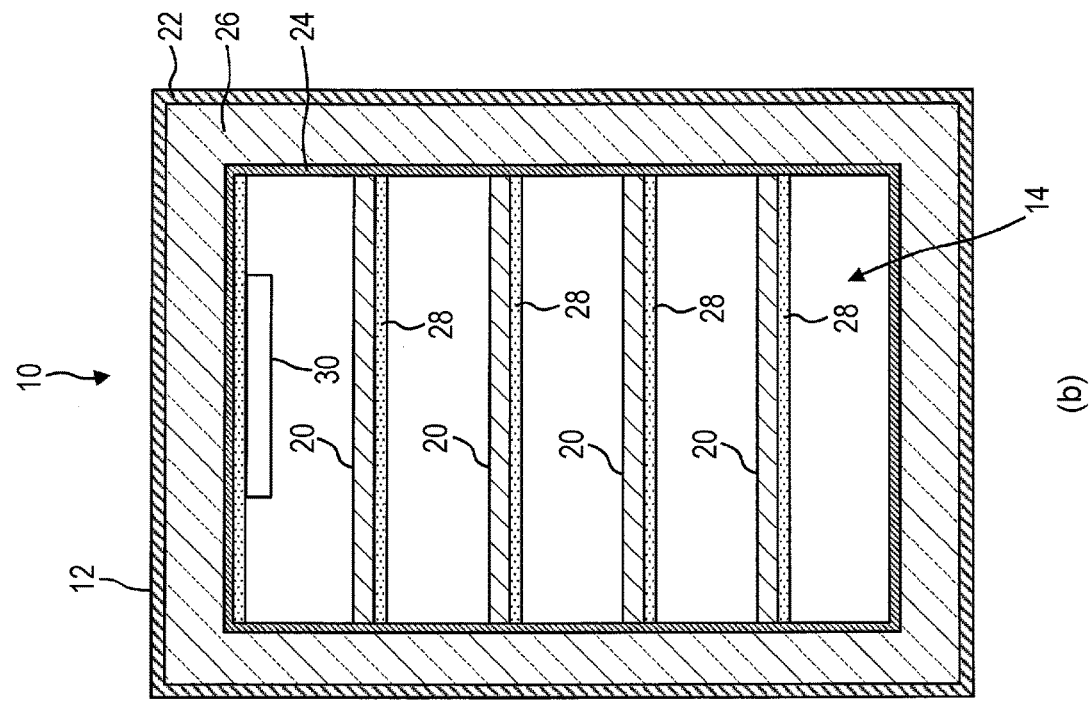
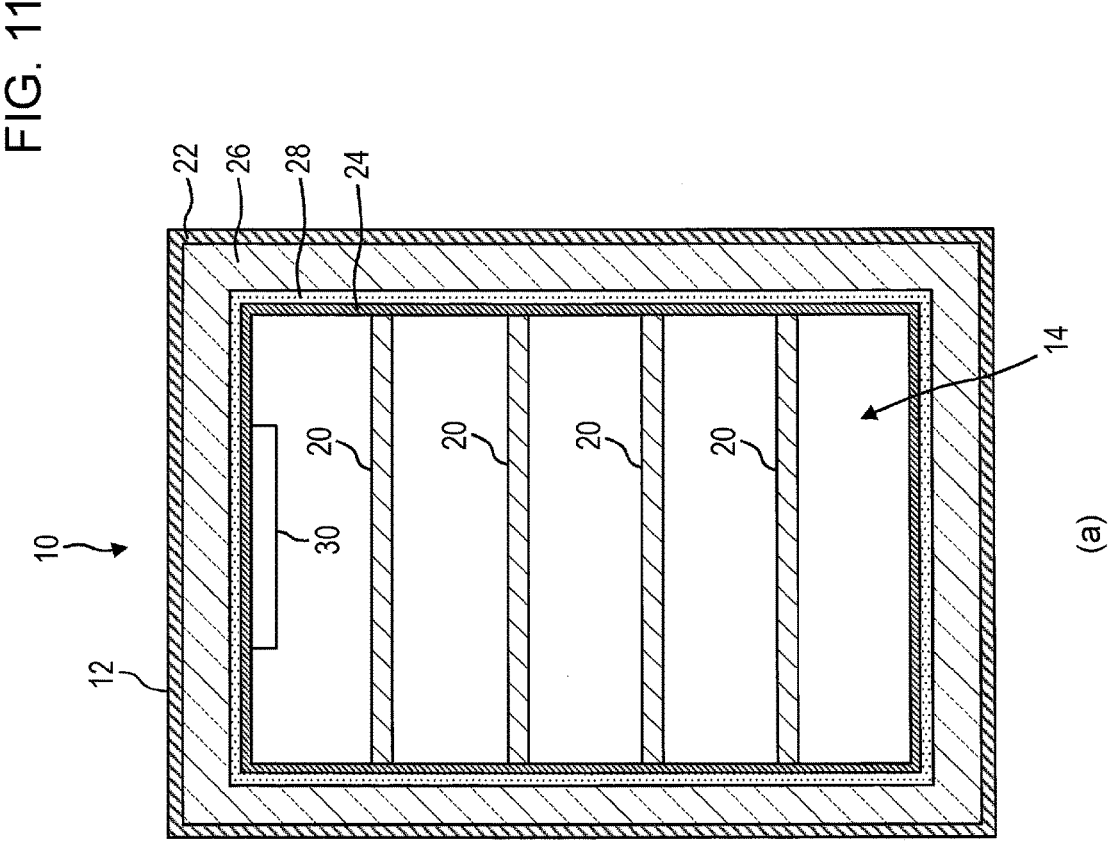

HEAT-STORAGE MATERIAL, AND HEAT-STORAGE MEMBER, STORAGE CONTAINER, TRANSPORTATION/STORAGE CONTAINER, CONSTRUCTION MATERIAL, AND ARCHITECTURAL STRUCTURE USING THE SAME

TECHNICAL FIELD

The present invention relates to a heat-storage material, and a heat-storage member, a storage container, a transportation/storage container, a construction material, and an architectural structure that use the heat-storage material.

BACKGROUND ART

Clathrate hydrates are safe and low-cost substances having high latent heat (heat of formation) and promising as heat-storage substances of heat-storage materials which can be used in a temperature zone equal to or higher than 0° C. to which water or inorganic salt aqueous solution cannot be applied. Tetrabutylammonium bromide (TBAB) has been known as clathrate hydrates used as the heat-storage substances. PTL 1 describes a heat-storage material in which disodium hydrogen phosphate is added to prevent supercooling at the time of generating a clathrate hydrate such as TBAB.

CITATION LIST

Patent Literature

PTL 1: Japanese Unexamined Patent Application Publication No. 2008-214527

SUMMARY OF INVENTION

Technical Problem

However, in a case of adding disodium hydrogen phosphate in a powder state to a heat-storage material, the supercooling may not be stably prevented depending on a storage temperature of the heat-storage material. This problem occurs when a low-order hydrate or an anhydride of disodium hydrogen phosphate is precipitated in the heat-storage material due to an increase in a temperature of the heat-storage material, in a case where disodium hydrogen phosphate powder is added to a liquid heat-storage material and disodium hydrogen phosphate is not completely dissolved. When the temperature of the heat-storage material is decreased to a temperature equal to or lower than a peritectic point of a hydrate of disodium hydrogen phosphate, in a state where the low-order hydrate or the anhydride is precipitated in the heat-storage material, a hydration reaction is started. The hydration reaction for changing the low-order hydrate or the anhydride to a high-order hydrate proceeds in a solid phase, and this causes a slow reaction rate. Accordingly, a precipitate layer of a high-order hydrate may be formed over the low-order hydrate and the anhydride before completing the hydration reaction. When a precipitate layer of a high-order hydrate is formed, the movement of water to the low-order hydrate is prevented and the low-order hydrate may not be changed to a high-order hydrate. As a result, the hydration reaction may be finished before all of the anhydride and the low-order hydrate changing to a high-order hydrate. Thus, the effect of the supercooling prevention may not be obtained due to phase separation between the heat-storage substance of the heat-storage material and disodium hydrogen phosphate that is a supercooling preventing agent.

An object of the invention is to provide a heat-storage material which can prevent supercooling.

Solution to Problem

According to an aspect of the invention for achieving the above-mentioned object, a heat-storage material may include a heat-storage substance which reversibly changes between an aqueous solution containing tetraalkylammonium salt and a clathrate hydrate containing the tetraalkylammonium salt as a guest molecule; and alum which is added to the aqueous solution.

In the heat-storage material of the invention, the tetraalkylammonium salt may be tetrabutylammonium bromide.

In the heat-storage material of the invention, the concentration of the tetrabutylammonium bromide in the aqueous solution may be approximately 25 wt % or more and 40 wt % or less.

In the heat-storage material of the invention, the alum may be potassium alum.

In the heat-storage material of the invention, the alum may be potassium alum dodecahydrate, and the concentration of the potassium alum dodecahydrate in the aqueous solution may be equal to or more than 2.5 wt %.

In the heat-storage material of the invention, the heat-storage material may further include a poor solvent for the alum, which is added to the aqueous solution, and the alum may be ammonium alum.

In the heat-storage material of the invention, the poor solvent may be methanol, ethanol, 1-propanol, 2-propanol, tert-butyl alcohol, or acetone.

In the heat-storage material of the invention, the concentration of the 2-propanol in the aqueous solution may be 1.5 wt % or more and 3 wt % or less.

In the heat-storage material of the invention, the ammonium alum may be ammonium alum dodecahydrate, and the concentration of the ammonium alum dodecahydrate in the aqueous solution may be equal to or more than 2 wt %.

In the heat-storage material of the invention, the pH of the aqueous solution may be approximately 6.

According to an aspect of the invention for achieving the above-mentioned object, a storage container may include a storage chamber which stores storage materials; a heat source for maintaining a temperature in the storage chamber at a predetermined temperature; and a heat-storage member which is disposed for absorbing heat flowing into the storage chamber and in which the heat-storage material of the invention is used.

According to an aspect of the invention for achieving the above-mentioned object, a transportation/storage container may use the heat-storage material of the invention.

According to an aspect of the invention for achieving the above-mentioned object, a construction material may use the heat-storage material of the invention.

According to an aspect of the invention for achieving the above-mentioned object, an architectural structure may include the construction material of the invention.

Advantageous Effects of Invention

According to the invention, it is possible to realize a heat-storage material which can prevent supercooling.

BRIEF DESCRIPTION OF DRAWINGS

FIG. 1 is a diagram showing values of physical properties of tetrabutylammonium bromide (TBAB) used in a heat-storage substance of a heat-storage material according to an embodiment of the invention.

FIG. 2 is a diagram showing values of physical properties of candidates for a supercooling preventing agent of the heat-storage material according to the embodiment of the invention.

FIG. 3 is a diagram showing effects of supercooling prevention in Example 1 of the embodiment of the invention.

FIG. 7 is a diagram showing effects of supercooling prevention in Example 2 of the embodiment of the invention.

FIG. 8 is a diagram showing pH values and effects of supercooling prevention of heat-storage material samples according to Example 3 of the embodiment of the invention.

FIG. 9 is a diagram showing a lattice constant and a crystal system of alum and mineral salts configuring the alum.

FIG. 11 is a sectional view of the refrigerator 10 according to Example 4 of the embodiment of the invention.

DESCRIPTION OF EMBODIMENTS

Figures 4, 5:
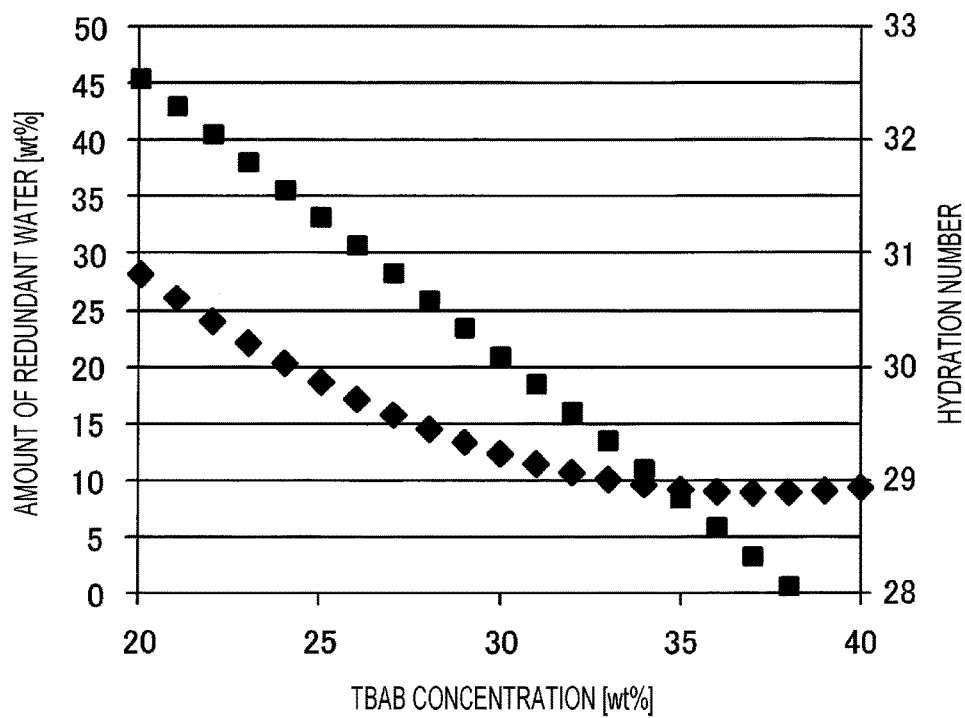
FIG. 4 is a diagram showing a relationship between the concentration of TBAB, an amount of redundant water, and hydration number, when generating TBAB clathrate hydrate.
FIG. 5 is a diagram showing effects of supercooling prevention in Example 2 of the embodiment of the invention.

A heat-storage material according to an embodiment of the invention will be described with reference to FIG. 1 to FIG. 9. The heat-storage material according to the embodiment includes a heat-storage substance which reversibly changes between an aqueous solution containing tetraalkylammonium salt (hereinafter, referred to as a "tetraalkylammonium salt aqueous solution") and a clathrate hydrate containing tetraalkylammonium salt as a guest molecule (hereinafter, referred to as a "tetraalkylammonium salt clathrate hydrate"). The tetraalkylammonium salt aqueous solution changes into the tetraalkylammonium salt clathrate hydrate at a predetermined temperature. The temperature at which the tetraalkylammonium salt clathrate hydrate is generated (hereinafter, referred to as a "clathrate hydrate generation temperature") is controlled by the concentration of the tetraalkylammonium salt. Herein, the clathrate hydrate generation temperature is a temperature at which the tetraalkylammonium salt clathrate hydrate is generated in a case where the supercooling does not occur.

The tetraalkylammonium salt clathrate hydrate is decomposed into tetraalkylammonium salt and water at a predetermined temperature. Accordingly, the tetraalkylammonium salt clathrate hydrate changes into the tetraalkylammonium salt aqueous solution at a predetermined temperature. A temperature at which the tetraalkylammonium salt clathrate hydrate changes into the tetraalkylammonium salt aqueous solution (hereinafter, a "clathrate hydrate decomposition temperature") substantially coincides with the clathrate hydrate generation temperature.

In a heat-storage substance of the heat-storage material according to the embodiment, tetrabutylammonium bromide (TBAB) is used as the tetraalkylammonium salt. The aqueous solution containing the TBAB (hereinafter, referred to as a "TBAB aqueous solution") changes into a clathrate hydrate containing the TBAB as a guest molecule (hereinafter, referred to as a "TBAB clathrate hydrate"), when being cooled to a predetermined temperature.

In addition, in a case where the concentration of the TBAB is from 20 wt % to 40 wt % and the supercooling does not occur, the TBAB aqueous solution changes into the TBAB clathrate hydrate at approximately 8° C. to 12° C. In the same manner as described above, the TBAB clathrate hydrate changes into the TBAB aqueous solution at approximately 8° C. to 12° C. When the TBAB clathrate hydrate changes into the TBAB aqueous solution, the heat-storage material according to the embodiment absorbs heat while maintaining a substantially constant temperature. Accordingly, the heat-storage material according to the embodiment performs cold insulation by maintaining a substantially constant temperature for a predetermined period of time. Therefore, the heat-storage material according to the embodiment is preferable for cold insulation in a refrigerator in which it is necessary to maintain a temperature inside at approximately 10° C., in order to prevent decay of food. In addition, hereinafter, the state of the heat-storage substance changing from the TBAB aqueous solution into the TBAB clathrate hydrate will be described as that the heat-storage material is solidified, and the state of the heat-storage substance changing from the TBAB clathrate hydrate into the TBAB aqueous solution will be described as that the heat-storage material is melted.

As quaternary ammonium salt generating a clathrate hydrate, tetrabutylammonium salt and isopentyl ammonium salt have been known other than the TBAB. Rational formulae of tetrabutylammonium salts generating a clathrate hydrate and clathrate hydrate generation temperatures thereof are (n-$C_4H_9$)$_4$NF (28.3° C.), (n-$C_4H_9$)$_4$NCl (15.0° C.), (n-$C_4H_9$)$_4$NCH$_3$CO$_2$ (15.1° C.) [(n-$C_4H_9$)$_4$N]$_2$CrO$_4$ (13.6° C.) [(n-$C_4H_9$)$_4$N]$_2$WO$_4$ (15.1° C.) [(n-$C_4H_9$)$_4$N]$_2$C$_2$O$_4$ (16.8° C.) [(n-$C_4H_9$)$_4$N]$_2$HPO$_4$ (17.2° C.), (n-$C_4H_9$)$_4$NHCO$_3$ (17.8° C.). In addition, rational formulae of isopentyl ammonium salts generating a clathrate hydrate and clathrate hydrate generation temperatures thereof are (i-$C_5H_{11}$)$_4$NF (31.2° C.), (i-$C_5H_{11}$)$_4$NCl (29.8° C.), [(i-$C_5H_{11}$)$_4$N]$_2$CrO$_4$ (21.6° C.), [(i-$C_5H_{11}$)$_4$N]$_2$WO$_4$ (22.4° C.). Since each material has a different clathrate hydrate generation temperature, it is possible to select a heat-storage substance according to the temperature used.

The change at the time of the solidification of the heat-storage material is a change from liquid to solid. At the time of the change from liquid to solid, supercooling occurs, for example, in a case where an energy state of molecules in the TBAB aqueous solution is stabled or a case where there is no nucleus for nucleation. When the supercooling occurs, the heat-storage material is not solidified, even when being cooled to the clathrate hydrate generation temperature. When the heat-storage material is not solidified, it is difficult to perform the cold insulation by maintaining a substantially constant temperature.

Thus, in the heat-storage material using the TBAB, a supercooling preventing agent which prevents the supercooling is necessary. The supercooling preventing agent can prevent the supercooling by decreasing a degree of supercooling. In the embodiment, the materials of the supercooling preventing agent were examined based on a surface parameter used in the heterogeneous nucleation theory. A surface parameter m in the heterogeneous nucleation theory is represented by the following Equation (1).

$$m = \cos\theta = (\sigma_{13} - \sigma_{23})/\sigma_{12} \quad (1)$$

Herein, θ represents a contact angle of a spore of a crystal with respect to a nucleus (impurity particles), $\sigma_{13}$ represents a surface energy between the aqueous solution and the nucleus, $\sigma_{23}$ represents a surface energy between the nucleus and the spore, and $\sigma_{12}$ represents a surface energy between the aqueous solution and the spore. As a value of the surface parameter m is close to 1, the nucleation proceeds with a small-sized spore, and the supercooling is decreased. Since $\sigma_{12}$ and $\sigma_{13}$ are magnitudes of the surface energy between a solvent and a solute, the magnitudes thereof are relatively small. Accordingly, in Expression (1), as the value of $\sigma_{23}$ is decreased, the surface parameter m is close to 1.

FIG. 1 shows values of physical properties of the TBAB used in the heat-storage substance of the heat-storage material of the embodiment. FIG. 1 shows a molecular weight, a melting point, a lattice constant [Å], solubility [wt %] with respect to water at 15° C., solubility [wt %] with respect to water at 30° C., solubility [M(mol/l)] with respect to water at 15° C., and solubility [M(mol/l)] with respect to water at 30° C., as the values of physical properties of the TBAB. As shown in FIG. 1, the molecular weight of the TBAB is 322.37 and the melting point thereof is 103° C. The lattice constant of the TBAB is a=b=23.65 (Å) and c=12.5 (Å). Herein, the lattice constant of the TBAB is set as a lattice constant of the TBAB clathrate hydrate in which the number of hydrated water is 29. The TBAB clathrate hydrate in which the hydration number is 29 is generated, when the concentration of the TBAB in the TBAB aqueous solution is 25 wt %. In a case where the concentration of the TBAB in the TBAB aqueous solution is 25 wt %, the clathrate hydrate decomposition temperature becomes approximately 10° C. and the TBAB is suitable as the heat-storage substance of the heat-storage material installed in a refrigerator. In addition, the solubility [wt %] of TBAB with respect to water at 15° C. and the solubility [wt %] thereof with respect to water at 30° C. are 60. Further, solubility [M] of TBAB with respect to water at 15° C. and solubility [M] thereof with respect to water at 30° C. are 1.86122.

The surface energy between the different kinds of crystals become minimum, when a lattice misfit ratio between the different kinds of crystals is 1.0, and in addition, it is also reported that the surface energy thereof is decreased, when the lattice misfit ratio is 0.5 and 2.0 (N. H. Fletcher, J. Appl. Phys. 35, 234 (1964)). In this document, a change of the surface energy in a case of extremely great value of the lattice misfit ratio is indicated by calculation. The document shows a primary crystal calculation model obtained by setting a surface energy as an elastic deformation energy considering the misfit energy of resonance and transition between the different kinds of crystals, two potential models are assumed with this calculation model, and in each model, a change of the surface energy is calculated up to a region where the lattice misfit ratios are largely different. The result shows that the surface energy is decreased, even in a region where the lattice misfit ratios are largely different from each other (lattice misfit ratio: 0.5 and 2.0) in both potential models. Accordingly, the nucleation may easily occur and the supercooling may be prevented, not only in a case where the similarity of a crystal structure between the heat-storage substance (spore) and the supercooling preventing agent (nucleus) is high and lattice misfit ratio is 1.0, but also in a case where the ratio is 0.5 and 2.0.

In the embodiment, as candidates for the supercooling preventing agent, ammonium alum dodecahydrate (AlNH$_4$(SO$_4$)$_2$.12H$_2$O), potassium alum dodecahydrate (AlK(SO$_4$)$_2$.12H$_2$O), sodium tetraborate decahydrate (Na$_2$B$_4$O$_7$.10H$_2$O), disodium hydrogen phosphate dodecahydrate (Na$_2$HPO$_4$.12H$_2$O), and sodium sulfate decahydrate (Na$_2$SO$_4$.10H$_2$O) were investigated.

FIG. 2 shows values of physical properties of the candidates for the supercooling preventing agent investigated in the embodiment. FIG. 2 shows a molecular weight, a melting point, a lattice constant, solubility [wt %] with respect to water at 15° C., solubility [wt %] with respect to water at 30° C., solubility [M(mol/l)] with respect to water at 15° C., and solubility [M(mol/l)] with respect to water at 30° C., as the values of physical properties of the candidates for the supercooling preventing agent. As shown in FIG. 2, the molecular weight of the ammonium alum dodecahydrate is 453.33 and the melting point thereof is 94° C. The lattice constant of the ammonium alum dodecahydrate is a=b=c=12.24 (Å). The solubility [wt %] of the ammonium alum dodecahydrate with respect to water at 15° C. is 14.8 and the solubility [wt %] thereof with respect to water at 30° C. is 28.5. The solubility [M] of the ammonium alum dodecahydrate with respect to water at 15° C. is 0.32647 and the solubility [M] thereof with respect to water at 30° C. is 0.62868.

In addition, the molecular weight of the potassium alum dodecahydrate is 474.39 and the melting point thereof is 92° C. The lattice constant of the potassium alum dodecahydrate is a=b=c=12.158 (Å). The solubility [wt %] of the potassium alum dodecahydrate with respect to water at 15° C. is 9.2 and the solubility [wt %] thereof with respect to water at 30° C. is 15.4. The solubility [M] of the ammonium alum dodecahydrate with respect to water at 15° C. is 0.19393 and the solubility [M] thereof with respect to water at 30° C. is 0.32463.

In addition, the molecular weight of the sodium tetraborate decahydrate is 381.37 and the harmonic melting point is 62° C. The lattice constant of the sodium tetraborate decahydrate is a=11.885 (Å), b=10.654 (Å), c=12.206 (Å), α=90°, β=106.623°, and γ=90°. The solubility [wt %] of the sodium tetraborate decahydrate with respect to water at 15° C. is 3.79 and the solubility [wt %] thereof with respect to water at 30° C. is 7.2. The solubility [M] of the sodium tetraborate decahydrate with respect to water at 15° C. is 0.09938 and the solubility [M] thereof with respect to water at 30° C. is 0.18879.

In addition, the molecular weight of the disodium hydrogen phosphate dodecahydrate is 358.14 and the non-harmonic melting points are 35.2° C., 48.3° C., and 92.5° C. The disodium hydrogen phosphate dodecahydrate is subjected to non-harmonic melting at the non-harmonic melting points and changes into a low-order hydrate. The lattice constant of the disodium hydrogen phosphate dodecahydrate is a=14.178 (Å), b=9.021 (Å), c=12.771 (Å), α=90°, β=108.88°, and γ=90°. The solubility [wt %] of the disodium hydrogen phosphate dodecahydrate with respect to water at 15° C. is 7.2 and the solubility [wt %] thereof with respect to water at 30° C. is 72. The solubility [M] of the disodium hydrogen phosphate dodecahydrate with respect to water at 15° C. is 0.20104 and the solubility [M] thereof with respect to water at 30° C. is 2.01039.

In addition, the molecular weight of the sodium sulfate decahydrate is 322.19 and the non-harmonic melting point is 32.5° C. The sodium sulfate decahydrate is subjected to non-harmonic melting at the non-harmonic melting point and changes into an anhydride. The lattice constant of the sodium sulfate decahydrate is a=11.512 (Å), b=10.370 (Å), c=12.847 (Å), α=90°, β=107.789°, and γ=90°. The solubility [wt %] of the sodium sulfate decahydrate with respect to water at 15° C. is 15 and the solubility [wt %] thereof with respect to water at 30° C. is 40. The solubility [M] of the sodium sulfate decahydrate with respect to water at 15° C. is 0.46556 and the solubility [M] thereof with respect to water at 30° C. is 1.24150.

Example 1

Next, the heat-storage material according to Example 1 of the embodiment will be described using FIG. 3 with reference to FIG. 1 and FIG. 2. As shown in FIG. 1 and FIG. 2, the similarity of the crystal structure between the TBAB, and the ammonium alum dodecahydrate and the potassium alum dodecahydrate is high, and the lattice misfit ratio between the TBAB and the ammonium alum dodecahydrate becomes a value close to 1.0 and 2.0. In the same manner as described above, the lattice misfit ratio between the TBAB and the ammonium alum dodecahydrate becomes a value close to 1.0 and 2.0. Accordingly, the inventors have considered that the nucleation easily occurs and supercooling at the time of generating a clathrate hydrate can be prevented, when the ammonium alum dodecahydrate or the potassium alum dodecahydrate is added to the TBAB aqueous solution.

In this example, the concentration of the TBAB aqueous solution was set as approximately 25 wt %, and the supercooling prevention effect at the time of generating a clathrate hydrate was investigated. In this example, heat-storage material samples in which the concentration of the ammonium alum dodecahydrate and the potassium alum dodecahydrate in the TBAB aqueous solution is 2.0 wt %, 2.5 wt %, 3.0 wt, and 4.0 wt % were manufactured.

In this example, 9.0 g of each heat-storage material sample was sealed in a 10 ml glass sample bottle, the sample bottle was cooled in a refrigerator for approximately 18 hours, and the supercooling prevention effect was verified. The sample bottle was disposed at a position at the highest temperature, in a case where the temperature in the refrigerator is set as "middle" (approximately 3° C. to 5° C.) The temperature of the position was 3.2° C. In the above-mentioned conditions, the experiment was performed three times for one heat-storage material sample. When the heat-storage material sample is solidified in all of three experiments, it is determined that the supercooling prevention effect is obtained, and when the heat-storage material sample is not solidified even only once, it is determined that the supercooling prevention effect is not obtained.

FIG. 3 is a table showing verification results of the supercooling prevention effect of this example. In FIG. 3, "O" is written in a case where the heat-storage material sample is solidified, and "X" is written in a case where the heat-storage material sample is not solidified. The heat-storage material sample (TBAB: 25.3 wt %) in which the concentration of the ammonium alum dodecahydrate is 2.0 wt % was not solidified in all of three experiments. The heat-storage material sample (TBAB: 25.1 wt %) in which the concentration of the ammonium alum dodecahydrate is 2.5 wt % was not solidified in all of three experiments. The heat-storage material sample (TBAB: 25.0 wt %) in which the concentration of the ammonium alum dodecahydrate is 3.0 wt % was solidified only in the second experiment and was not solidified in the first experiment and the third experiment. The heat-storage material sample (TBAB: 24.8 wt %) in which the concentration of the ammonium alum dodecahydrate is 4.0 wt % was solidified in the second experiment and the third experiment and was not solidified in the first experiment.

As described above, in a case where the ammonium alum dodecahydrate was added as the supercooling preventing agent, a heat-storage material sample solidified in all of three experiments was not obtained. The heat-storage material sample which is not solidified even only once among the three times of the experiment is not preferable, when considering reliability of the heat-storage material.

Meanwhile, the heat-storage material sample (TBAB: 25.3 wt %) in which the concentration of the potassium alum dodecahydrate is 2.0 wt % was solidified in the first experiment and the third experiment and was not solidified in the second experiment. The heat-storage material sample (TBAB: 25.1 wt %) in which the concentration of the potassium alum dodecahydrate is 2.5 wt % was solidified in all of three experiments. The heat-storage material sample (TBAB: 25.0 wt %) in which the concentration of the potassium alum dodecahydrate is 3.0 wt % was solidified in all of three experiments. The heat-storage material sample (TBAB: 24.8 wt %) in which the concentration of the potassium alum dodecahydrate is 4.0 wt % was solidified in all of three experiments.

As described above, in a case where the potassium alum dodecahydrate is added as the supercooling preventing agent, the heat-storage material sample was solidified in all of three experiments, when the concentration of the potassium alum dodecahydrate is equal to or more than 2.5 wt %. In addition, when the concentration of the TBAB is increased, the clathrate hydrate generation temperature is increased. Accordingly, as the concentration of the TBAB is increased, the nucleation in the TBAB aqueous solution occurs at a relatively high temperature. Therefore, even when the concentration of the TBAB in the TBAB aqueous solution is from 25 wt % to 40 wt %, the supercooling can be prevented, when the concentration of the potassium alum dodecahydrate in the TBAB aqueous solution is equal to or more than 2.5 wt %.

The heat-storage material according to this example includes the heat-storage substance which reversibly changes between the TBAB aqueous solution and the TBAB clathrate hydrate, and potassium alum which is added to the TBAB aqueous solution. In addition, the potassium alum dodecahydrate is used as the potassium alum. The concentration of the potassium alum dodecahydrate in the TBAB aqueous solution is 2.5 wt %. The heat-storage material according to this example can prevent the supercooling. In addition, when the concentration of the TBAB in the TBAB aqueous solution is approximately equal to or more than 25 wt % and equal to or smaller than 40 wt %, the heat-storage material according to this example is solidified at approximately 3° C. and started to be melted at 6° C. to 7° C. Therefore, the heat-storage material according to this example can be suitably used for cold insulation in a refrigerator.

Example 2

Next, the heat-storage material according to Example 2 of the embodiment will be described using FIG. 4 to FIG. 7, with reference to FIG. 1 and FIG. 2. FIG. 4 is a graph showing a relationship between the concentration of the TBAB aqueous solution, the number of hydrated water (hydration number) when the TBAB aqueous solution changed into the TBAB clathrate hydrate, and the amount of redundant water which did not become hydrated water. In FIG. 4, a vertical axis on the left side indicates the amount of redundant water [wt %], a vertical axis on the right side indicates the hydration number, and a horizontal axis indicates the concentration of TBAB in the TBAB aqueous solution. In addition, in FIG. 4, the amount of redundant water is indicated using "■" and the hydration number is indicated using "♦".

As shown in FIG. 4, as the concentration of TBAB is increased, the hydration number is increased and the amount of redundant water is decreased. In addition, when the concentration of TBAB is approximately 40 wt %, the clathrate hydrate generation temperature of the TBAB clathrate hydrate becomes the harmonic melting point. Accordingly, when the concentration of TBAB is approximately 40 wt %, the redundant water is removed.

In addition, in a case where the concentration of TBAB is from 20 wt % to 38 wt %, the redundant water exists when the TBAB clathrate hydrate is generated. In a case where the supercooling preventing agent is added to the TBAB aqueous solution and the TBAB aqueous solution changes into the TBAB clathrate hydrate, the supercooling preventing agent exists in the redundant water.

In addition, it is reported that the density of the TBAB aqueous solution becomes substantially 1, in a case where the TBAB concentration is from 0 wt % to 40 wt % (Sasaki Naoe, Ogawa Kiyoshi, The journal of the College of Engineering of Nihon University Vol. 53 No. 2, p. 13 to 18, March, 2012).

Meanwhile, as the concentration of the dissolved inorganic salt is increased, the density of the inorganic salt aqueous solution is increased. Accordingly, in a case where the TBAB aqueous solution and the inorganic salt aqueous solution are mixed with each other, as the concentration of the inorganic salt aqueous solution increases, a difference in density between the TBAB aqueous solution and the inorganic salt aqueous solution is increased, and therefore, the phase separation between the TBAB aqueous solution and the inorganic salt aqueous solution may occur. As described above, when inorganic salt having high solubility with respect to water is added to the TBAB aqueous solution until saturated concentration is obtained, the phase separation between the TBAB aqueous solution and the inorganic salt aqueous solution may occur. Since the inorganic salt aqueous solution having high density exist in the lower part, the TBAB aqueous solution and the inorganic salt aqueous solution are hardly mixed with each other in portions other than the interface. Thus, even when the nucleus of the supercooling preventing agent is precipitated by decreasing the temperature, there is a low possibility of the spore of the heat-storage substance being in contact with the nucleus. In addition, since there is a high possibility that the nucleus of the supercooling preventing agent is generated on a wall surface of the container than on the interface in the liquid, the precipitation may be started, with a high possibility, on the wall surface on the lower portion of the container where the inorganic salt aqueous solution exists. Accordingly, the spore of the heat-storage substance hardly comes into contact with the nucleus of the supercooling preventing agent, and it is considered that the supercooling prevention effect is not realized.

Meanwhile, even when the inorganic salt having low solubility with respect to water is added to the TBAB aqueous solution and concentration of the inorganic salt is saturated, a weight ratio of the inorganic salt dissolved is small, and accordingly, a difference in density between the inorganic salt aqueous solution and the TBAB aqueous solution is not increased. Therefore, the phase separation hardly occurs between the inorganic salt aqueous solution of the inorganic salt having low solubility and the TBAB aqueous solution, and it is considered that the inorganic salt aqueous solution is dispersed uniformly to a certain extent in a solution. In this case, even when the nucleus of the supercooling preventing agent is precipitated on the wall surface by decreasing the temperature, the TBAB aqueous solution exists around the nucleus, a possibility that the spore of the heat-storage substance comes into contact with the nucleus of the supercooling preventing agent is increased, and it is considered that the supercooling prevention effect is realized.

In addition, a case where the supercooling preventing agent is put in a state of solid, without dissolving is considered. In this case, the supercooling preventing agent has a greater specific gravity than that of water, and accordingly, the supercooling preventing agent is accumulated on the lower portion of the container. In a case of the inorganic salt having high solubility, approximately several wt % thereof may be dissolved over time, and it is not practically advantageous to add the amount to be accumulated on the lower portion. Meanwhile, in a case of the inorganic salt having low solubility, the inorganic salt is slowly dissolved on the interface between the solid accumulated on the lower portion and the TBAB aqueous solution. Accordingly, while the supercooling preventing agent is accumulated on the lower portion, it is considered that, a layer of a saturated solution of the supercooling preventing agent is generated on the interface between the solid supercooling preventing agent and the TBAB aqueous solution. It is considered that the nucleus of the supercooling preventing agent is easily precipitated on the surface of the solid supercooling preventing agent more than on the inner wall surface of the container, but since the amount of the saturated solution is small, it is considered that the substantially same effects of the supercooling prevention effect is realized in a case where the supercooling preventing agent is dissolved and a case where the supercooling preventing agent is added in a state of solid.

As described above, the supercooling prevention effect was verified using sodium tetraborate having lowest solubility with respect to water among the supercooling preventing agents described in FIG. 2. In this example, in the same manner as in Example 1, sodium tetraborate decahydrate was added to the TBAB aqueous solution in which the concentration of TBAB is 25 wt %, to manufacture a heat-storage material sample. The concentration of sodium tetraborate decahydrate in the TBAB aqueous solution was set as 3.0 wt %.

In addition, in this example, the supercooling prevention effect was verified at the cooling temperature, for the cooling time, and with the number of times of experiments which are the same as those in Example 1. FIG. 5 is a table showing verification results of the supercooling prevention effect of this example. In FIG. 5, "O" is written in a case where the heat-storage material sample is solidified, and "X" is written in a case where the heat-storage material sample is not solidified. As shown in FIG. 5, the heat-storage material sample was solidified in all of three experiments.

As described above, it was found that the sodium tetraborate having low solubility with respect to water is suitable as the supercooling preventing agent. For comparison, a heat-storage material sample using sodium sulfate decahydrate having high solubility with respect to water as a supercooling preventing agent was manufactured and the supercooling prevention effect was verified, but the supercooling prevention effect was not obtained. Thus, it is considered that a material having low solubility with respect to water is suitable as the supercooling preventing agent.

Herein, when referring to FIG. 2, although the lattice constants of the ammonium alum dodecahydrate and the potassium alum dodecahydrate are substantially the same, there is a difference in the supercooling prevention effect between a case where the ammonium alum dodecahydrate is added to the TBAB aqueous solution, and a case where the potassium alum dodecahydrate is added to the TBAB aqueous solution. This is considered as a difference generated because the solubility of the potassium alum dodecahydrate with respect to water is smaller than solubility of the ammonium alum dodecahydrate. Accordingly, the inventors have considered that it is possible to prevent the supercooling at the time of generating a clathrate hydrate using the ammonium alum as the supercooling preventing agent, when the solubility of the ammonium alum in the heat-storage material is decreased.

Figure 6:
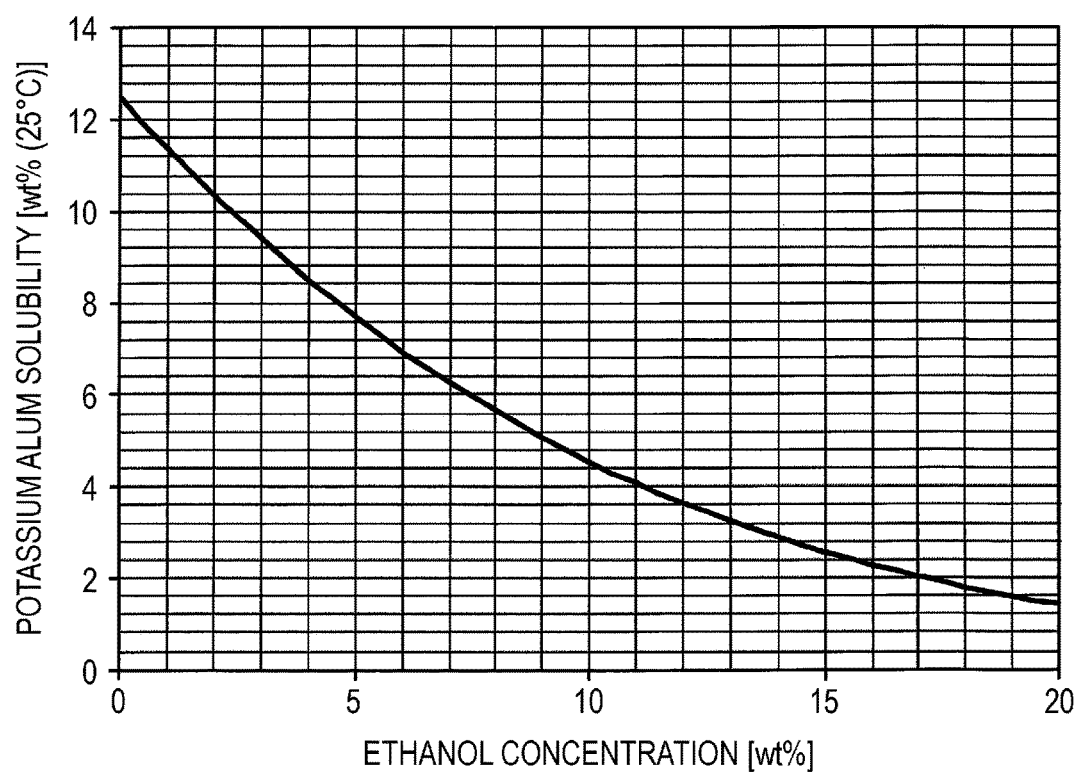
FIG. 6 is a diagram showing a relationship between solubility of potassium alum in a case where ethanol is added as a poor solvent to an aqueous solution, and the concentration of ethanol.

FIG. 6 is a graph showing a change of the solubility of the potassium alum in a case where a poor solvent is added to the aqueous solution. In this example, ethanol is used as a poor solvent with respect to the potassium alum. In FIG. 6, a vertical axis indicates solubility [wt %] of the potassium alum at 25° C. and a horizontal axis indicates concentration [wt %] of ethanol.

As shown in FIG. 6, as the concentration of ethanol in the aqueous solution increases, the solubility of the potassium alum with respect to the aqueous solution decreases. As described above, when the poor solvent with respect to the alum is added to the aqueous solution, the solubility of the alum with respect to the aqueous solution decreases. Accordingly, in this example, the poor solvent with respect to the ammonium alum was added to the TBAB aqueous solution to decrease the solubility of the ammonium alum in the heat-storage material sample, and the supercooling prevention effect was verified.

Methanol, ethanol, 1-propanol, 2-propanol, tert-butylalcohol or acetone is used as the poor solvent. The ammonium alum shows low solubility with respect to methanol, ethanol, 1-propanol, 2-propanol, tert-butylalcohol, and acetone. In addition, methanol, ethanol, 1-propanol, 2-propanol, tert-butylalcohol, and acetone are amphiphillic solvents which dissolve in water and an organic solvent. In this example, 2-propanol is used as the poor solvent.

In addition, in this example, the concentration of the TBAB aqueous solution was set as approximately 25 wt % and the supercooling prevention effect at the time of generating a clathrate hydrate was verified. In this example, the concentration of ammonium alum dodecahydrate in the TBAB aqueous solution was set as 2.0 wt % and 3.0 wt % and the concentration of 2-propanol in the TBAB aqueous solution was set as 1.5 wt % and 3.0 wt %.

In this example, 9.0 g of each heat-storage material sample was sealed in a 10 ml glass sample bottle, the sample bottle was cooled in a refrigerator for approximately 18 hours, and the supercooling prevention effect was verified. The sample bottle was disposed at a position at the highest temperature, in a case where the temperature in the refrigerator is set as "middle" (approximately 3° C. to 5° C.) The temperature of the position was 3.2° C. In the above-mentioned conditions, when the heat-storage material sample is solidified, it is determined that the supercooling prevention effect is obtained, and when the heat-storage material sample is not solidified, it is determined that the supercooling prevention effect is not obtained.

FIG. 7 is a table showing verification results of the supercooling prevention effect of this example. In FIG. 7, "O" is written in a case where the heat-storage material sample is solidified, and "X" is written in a case where the heat-storage material sample is not solidified. As shown in FIG. 7, the heat-storage material sample (TBAB: 24.9 wt %) in which the concentration of the ammonium alum dodecahydrate is 2.0 wt % and the concentration of 2-propanol is 1.5 wt % was solidified. The heat-storage material sample (TBAB: 24.5 wt %) in which the concentration of the ammonium alum dodecahydrate is 2.0 wt % and the concentration of 2-propanol is 3.0 wt % was solidified. The heat-storage material sample (TBAB: 24.6 wt %) in which the concentration of the ammonium alum dodecahydrate is 3.0 wt % and the concentration of 2-propanol is 1.5 wt % was solidified. The heat-storage material sample (TBAB: 24.3 wt %) in which the concentration of the ammonium alum dodecahydrate is 3.0 wt % and the concentration of 2-propanol is 3.0 wt % was solidified. As described above, when 2-propanol which is a poor solvent with respect to the ammonium alum is added to the heat-storage material, in addition to the ammonium alum dodecahydrate, it is possible to prevent the supercooling at the time of solidification of the heat-storage material.

The heat-storage material according to this example includes the heat-storage substance which reversibly changes between the TBAB aqueous solution and the TBAB clathrate hydrate, the ammonium alum added to the TBAB aqueous solution, and 2-propanol which is a poor solvent with respect to the ammonium alum. In addition, ammonium alum dodecahydrate is used as the ammonium alum. The concentration of the ammonium alum dodecahydrate in the TBAB aqueous solution is 2.0 wt % or more and 3.0 wt % or less. The concentration of the 2-propanol in the TBAB aqueous solution is 1.5 wt % or more and 3.0 wt % or less. The heat-storage material according to this example can prevent the supercooling. In addition, the heat-storage material according to this example can decrease the solubility of the ammonium alum and prevent the phase separation between the ammonium alum and the TBAB.

Example 3

The heat-storage material according to Example 3 of the embodiment will be described. As described above, the TBAB is used in the heat-storage material according to the embodiment. The TBAB aqueous solution is alkalescent (weak-basic) and has a problem regarding skin stimulation. In addition, in a case of installing the heat-storage material in a refrigerator or the like, the heat-storage material is desirably neutral or weakly acidic, when considering leakage of the heat-storage material.

In PTL 1, disodium hydrogen phosphate is added as the supercooling preventing agent to the heat-storage material. An aqueous solution of disodium hydrogen phosphate which is phosphate is alkalescent. Accordingly, disodium hydrogen phosphate cannot adjust the pH of the heat-storage material using TBAB to be neutral or weakly acidic.

An aqueous solution of each of potassium alum and ammonium alum shows acidity. Accordingly, it is considered that potassium alum and ammonium alum can also be used as a pH adjuster for the heat-storage material.

FIG. 8 shows pH values and the supercooling prevention effects of the heat-storage material samples manufactured in this example. In this example, the heat-storage material sample in which the concentration of TBAB is 25 wt % was manufactured. Sodium tetraborate, potassium alum dodecahydrate, ammonium alum dodecahydrate, aluminum hydroxide, sodium sulfate decahydrate, and boric acid were used as the supercooling preventing agent. The concentration of each of sodium tetraborate, potassium alum dodecahydrate, ammonium alum dodecahydrate, aluminum hydroxide, sodium sulfate decahydrate, and boric acid in the TBAB aqueous solution was 3 wt %. In this example, a heat-storage material sample not containing the supercooling preventing agent and heat-storage material samples containing respectively six different kinds of the supercooling preventing agents were manufactured and the pH and the supercooling prevention effect of each heat-storage material sample was verified. The aluminum hydroxide is used as a supercooling preventing agent, because it is considered that the supercooling prevention effect is also obtained by adding aluminum hydroxide, if aluminum is contained in the potassium alum and the ammonium alum and aluminum itself has the supercooling prevention effect. In the same manner, boric acid is used as a supercooling preventing agent, because it is considered that boric acid may have the supercooling prevention effect, since the sodium tetraborate has the supercooling prevention effect.

In this example, the pH of the heat-storage material sample was measured using a pH test paper. In addition, in this example, the verification was performed by setting the cooling temperature and the cooling period of time of the heat-storage material samples to be the same as those in Examples 1 and 2. In FIG. 8, "O" is written in a case where the heat-storage material sample is solidified, and "X" is written in a case where the heat-storage material sample is not solidified.

As shown in FIG. 8, the pH of the heat-storage material sample to which a supercooling preventing agent is not added was 8 to 9 and this heat-storage material sample was not solidified. The pH of the heat-storage material sample to which the sodium tetraborate is added was 10 and this heat-storage material sample was solidified. The pH of the heat-storage material sample to which the potassium alum dodecahydrate is added was 6 and this heat-storage material sample was solidified. The pH of the heat-storage material sample to which the ammonium alum dodecahydrate is added was 6 and this heat-storage material sample was solidified, when 2-propanol is further added thereto. Accordingly, "Δ (O by addition of 2-propanol)" is written in a column of "supercooling prevention effect" in FIG. 8. In addition, the pH of the heat-storage material sample to which the aluminum hydroxide is added was 7 and this heat-storage material sample was not solidified. The pH of the heat-storage material sample to which the sodium sulfate decahydrate is added was 7 to 8 and this heat-storage material sample was not solidified. The pH of the heat-storage material sample to which boric acid is added was 6 and this heat-storage material sample was not solidified.

As described above, the heat-storage material sample to which the potassium alum dodecahydrate or the ammonium alum dodecahydrate is added was weakly acidic in which the pH is 6 and was solidified by preventing the supercooling. Therefore, the potassium alum and the ammonium alum can be used also as a pH adjuster. The heat-storage material according to this example can set the pH of the TBAB aqueous solution as approximately 6. In addition, the heat-storage material according to this example is weakly acidic and is safe.

In the embodiment, the supercooling preventing agent is added so that the concentration of the supercooling preventing agent in the TBAB aqueous solution becomes higher than the saturated concentration. Accordingly, when a solid matter present in the heat-storage material in a liquid state is collected and subjected to X-ray analysis, it is possible to specify an additive which is added to the heat-storage material.

FIG. 9 shows lattice constants and crystal systems of the potassium alum dodecahydrate and the ammonium alum dodecahydrate. FIG. 9 further shows lattice constants and crystal systems of aluminum sulfate, potassium sulfate, and ammonium sulfate which are inorganic salts configuring the potassium alum or ammonium alum.

As shown in FIG. 9, the lattice constant of the potassium alum dodecahydrate (aluminum potassium sulfate) is a=b=c=12.16 (Å) and a crystal system is a cubic crystal. The lattice constant of the ammonium alum dodecahydrate (aluminium ammonium sulfate) is a=b=c=12.24 (Å) and a crystal system is a cubic crystal. The lattice constant of the aluminum sulfate is a=8.025 (Å), b=8.025 (Å), and c=21.36 (Å) and a crystal system is a rhombus. The lattice constant of the potassium sulfate is a=5.772 (Å), b=10.07 (Å), and c=7.483 (Å) and a crystal system is an orthorhombus. The lattice constant of the ammonium sulfate is a=7.730 (Å), b=10.50 (Å), and c=5.950 (Å) and a crystal system is an orthorhombus.

The potassium alum dodecahydrate is double salt configured with aluminum sulfate and potassium sulfate. The ammonium alum dodecahydrate is double salt configured with potassium sulfate and ammonium sulfate. However, as shown in FIG. 9, the crystal structures of the potassium alum dodecahydrate, and aluminum sulfate and potassium sulfate are not similar to each other. In addition, the crystal structures of the ammonium alum dodecahydrate, and aluminum sulfate and ammonium sulfate are not similar to each other. Accordingly, using the X-ray analysis, it is possible to specify an additive which is added to the heat-storage material.

Example 4

Figure 10:
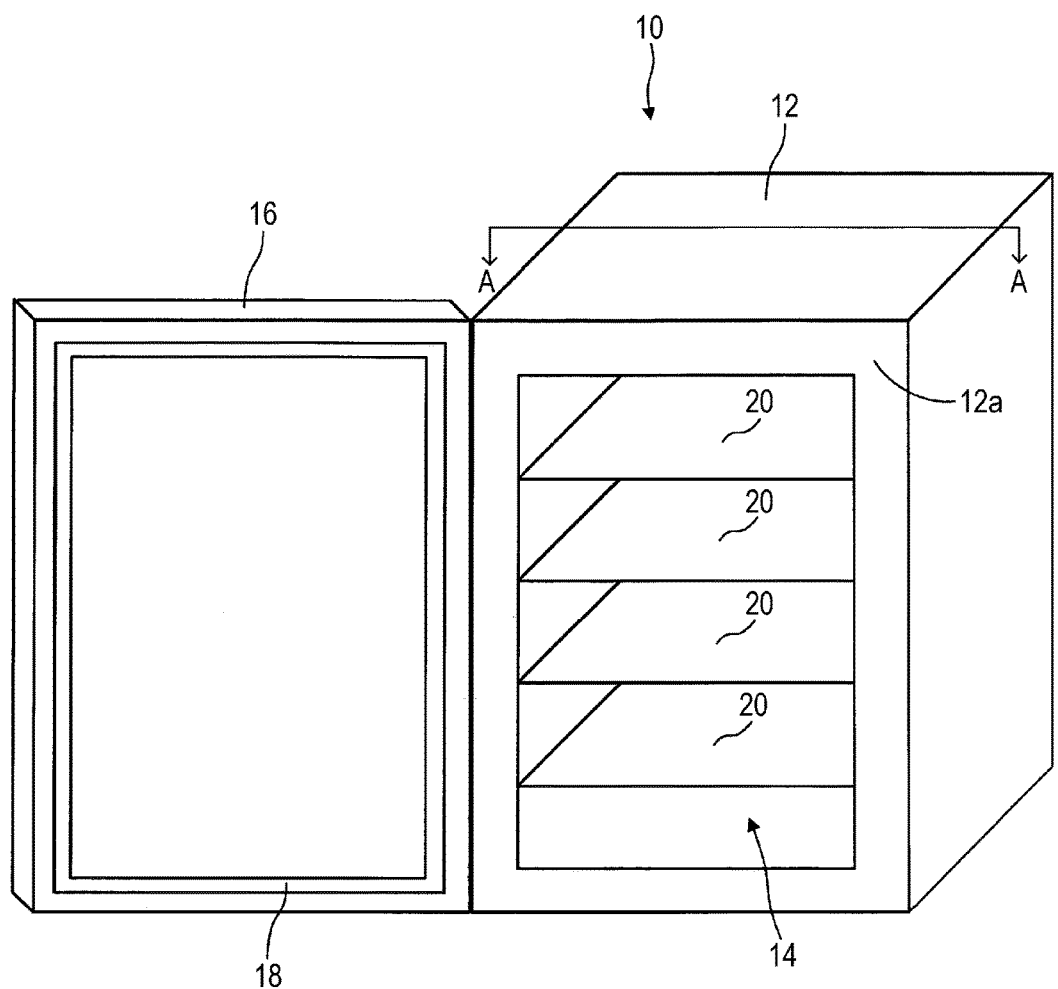
FIG. 10 is a perspective view of the appearance of a refrigerator 10 according to Example 4 of the embodiment of the invention.

Next, a storage container using the heat-storage material of the invention will be described with reference to FIG. 10. FIG. 10 is a perspective view of appearance of a refrigerator 10 as a storage container according to Example 4 of the embodiment. The refrigerator 10 includes a rectangular parallelepiped-shaped refrigerator main body 12 which is high in a vertical direction in an installed state. FIG. 10 shows a state where a front surface 12a of the refrigerator main body 12 is observed from the obliquely upper right side. A rectangular opening is provided on the front surface 12a of the refrigerator main body 12. A hollow box-shaped storage chamber 14 is provided in the refrigerator main body 12 by setting the rectangular opening as an opening edge. A door 16 made of, for example, resin is openably attached to the left side of the opening edge of the front surface through a hinge mechanism (not shown). FIG. 10 shows a state where the door 16 is opened. The door 16 has a rectangular flat plate shape including a region for closing the rectangular opening in a closed state. In addition, a door packing 18 for ensuring sealability when the door is closed is disposed on the side of the door 16 opposite the front surface 12a.

In addition, the refrigerator 10 includes shelf members 20 which are installed in the storage chamber 14 and on which storage materials such as food are placed. The shelf members 20 have a thin flat plate shape. In this example, four shelf members 20 are installed so that space in the rectangular parallelepiped-shape in the storage chamber 14 is substantially equivalently divided into five parts in a vertical direction. In addition, four pairs of shelf supports are provided on the right and left inner walls of the storage chamber 14 at the positions horizontally opposing each other. The end portions of the shelf members 20 are mounted on each of the pairs of the shelf supports so that the plate surface of the shelf member is parallel to a vertical direction in an installed state of the refrigerator 10.

Next, a configuration example of two kinds of the refrigerator 10 according to this example will be described with reference to FIG. 11. FIGS. 11(a) and 11(b) each show a state where a cross section obtained by cutting the refrigerator 10 in a vertical direction (direction of an arrow of A-A line) along A-A line in FIG. 10 is observed from the front surface 12a side. First, the common configuration of the two kinds of the refrigerator 10 will be described.

The refrigerator main body 12 of the refrigerator 10 includes an outer box 22, an inner box 24, and a heat-insulating material 26. The outer box 22 has a longitudinal rectangular parallelepiped shape in an installed state of the refrigerator 10. The outer box 22 is generally manufactured with a steel sheet. The outer box 22 configures outer walls of the storage chamber 14. The inner box 24 has a longitudinal rectangular parallelepiped shape which is smaller than that of the outer box 22 and is accommodated in the outer box 22. The space in the inner box 24 constitutes the storage chamber 14. In addition, the inner box 24 configures inner walls in the storage chamber 14. The inner box 24 is generally manufactured by vacuum molding using a resin plate made of acrylonitrile butadiene styrene (ABS) or the like. The heat-insulating material 26 is disposed between the outer box 22 and the inner box 24 so as to surround the storage chamber 14. The heat-insulating material 26 is used for preventing heat flowing into due to a difference in temperature with outside air. In the refrigerator, a foamed resin such as foamed styrene or foamed urethane having high heat insulation capacity is generally used as the heat-insulating material 26. In a case where the foamed styrene is used as the heat-insulating material 26, the foamed styrene molded in a plate shape is used. In a case of using the foamed urethane for the heat-insulating material 26, typically the outer box 22 and the inner box 24 are fixed with a jig, stock solutions of the foamed urethane such as a polyol solution and an isocyanate solution are injected to the space between both the boxes at the same time and foamed by heating, and the space is filled by the foamed urethane (urethane foaming process). With the urethane foaming process, since the heat-insulating layer is formed and an the urethane resin comes into tight contact with the wall surfaces of the outer box 22 and the inner box 24, a mechanical strength of the refrigerator main body 12 can be maintained, even when the thicknesses of the outer box 22 and the inner box 24 are decreased.

The refrigerator 10 operates a cooling device by receiving the supply of electrical power and the inner portion of the storage chamber 14 is maintained to be cool at a predetermined temperature (3° C. to 5° C.). A gas compression type cooling device is, for example, used as the cooling device. FIGS. 11(a) and 11(b) show a cooler 30 including an evaporator configuring a part of the gas compression type cooling device. The cooler 30 is a heat source (cold source) for warming (cooling) the inside of the storage chamber 14 at a predetermined temperature (3° C. to 5° C.). The cooler 30 is disposed on the upper portion of the storage chamber 14 and the refrigerator 10 of this example is a direct cooling type refrigerator. The refrigerator 10 may be an indirect cooling type refrigerator. In addition, instead of the gas compression type cooling device, a gas absorption type cooling device or an electronic cooling device using the Peltier effect can be used as the refrigerator 10.

The refrigerator 10 according to this example includes heat-storage members 28 including any of the heat-storage materials of Examples 1 to 3. In a case where the cooling device is not operated due to the supply of the electric power being blocked with blackout, for example, the refrigerator 10 including the heat-storage member 28 can maintain the temperature in the storage chamber 14 at a temperature equal to or lower than 10° C. for a predetermined period of time. Accordingly, the refrigerator 10 of this example can prevent decay of food or the like in the storage chamber 14 at the time of blackout or the like.

The heat-storage member 28 includes any of the heat-storage materials of Examples 1 to 3 and an accommodation member which accommodates the heat-storage material. A hard container such as a polyethylene blow-molding container can be used as the accommodation member. In this case, the blow-molding container may be filled with the heat-storage material, but it is desirable that the heat-storage material is gelated or thickened to fill the blow-molding container, in order to suppress the nucleus growth at the time of a phase change, to prevent a deterioration in surface flatness at the time of solidification, or to prevent leakage of the heat-storage material at the time of the container being damaged.

Next, an arrangement example of the heat-storage members 28 will be described. In the example shown in FIG. 11(a), the heat-storage member 28 is arranged on the outside of the storage chamber 14. More specifically, the heat-storage member 28 is arranged between the inner box 24 and the heat-insulating material 26 and on the outer side of the inner wall of the storage chamber 14. The heat-storage members 28 is arranged so as to surround the storage chamber 14. According to this configuration, the heat-storage member 28 can efficiently absorb the heat flowing through the outer box 22 and the heat-insulating material 26, and accordingly, it is possible to maintain the temperature in the storage chamber 14 to be constant for a long period of time.

In the example shown in FIG. 11(b), the heat-storage members 28 are arranged in the storage chamber 14. More specifically, the heat-storage members 28 are arranged on the lower surface side of the shelf members 20. In this example, the plate-shaped heat-storage members 28 are bonded to the lower surface side of the shelf members 20 using an adhesive, for example. According to this configuration, the heat-storage members 28 become large thermal loads, and it is possible to suppress a temperature increase in the storage chamber 14 due to heat flowing into the storage chamber 14 through the outer box 22, the heat-insulating material 26, and the inner box 24.

In a case where the heat-storage members 28 are arranged on the shelf members 20 shown in FIG. 11(b), heat temporarily flows into the storage chamber 14, and accordingly, the temperature in the storage chamber 14 tends to increase, when compared to a case where the heat-storage member 28 shown in FIG. 11(a) is arranged on the outer side of the inner wall of the storage chamber 14. However, in a case of arranging the heat-storage members 28 on the shelf members 20, it is possible to easily arrange the heat-storage members 28 also in a refrigerator of the related art.

As the arrangement of the heat-storage member 28, the arrangement on the outer side of the inner wall shown in FIG. 11(a), the shelf arrangement shown in FIG. 11(b), or both arrangements can be selected according to the purpose. For example, in a case where the arrangement on the outer side of the inner wall is selected as the arrangement of the heat-storage member 28 using tetrabutylammonium bromide (TBAB) as tetraalkylammonium salt for the heat-storage material of the invention, it is possible to maintain the temperature in the storage chamber 14 at a temperature equal to or lower than 10° C. for approximately 8 hours, even when the power is turned off under the ambient temperature of 30° C., by providing the heat-storage member 28 having a thickness of approximately 5 mm on the outer side of the inner wall of the refrigerator having an inside volume of 400 L.

The refrigerator 10 as the storage container according to this example includes the storage chamber 14 which stores storage materials, the cooler 30 to maintain the temperature of the inner portion of the storage chamber 14 at a predetermined cool temperature, and the heat-storage member 28 which is arranged for absorbing heat flowing into the storage chamber 14 and in which any of the heat-storage materials of Examples 1 to 3 is used. The heat-storage member 28 may be arranged on the outside of the storage chamber 14 as shown in FIG. 11(a), or the heat-storage members 28 may be arranged on the inside of the storage chamber 14 as shown in FIG. 11(b). The refrigerator 10 according to this example can maintain the temperature in the storage chamber 14 within the predetermined temperature for a predetermined period of time, even at the time of the supply of the electric power being blocked due to blackout or the like.

The heat-storage material of the invention can also be used in a transportation/storage container. In the same manner as the refrigerator 10 shown in FIG. 10 and FIG. 11, the transportation/storage container includes a main body, a door, a packing arranged on the door, an outer box, an inner box, and a heat-insulating material arranged between the outer box and the inner box, and a heat-storage member. When the cooling of the heat-storage member is performed by other separate devices, the transportation/storage container does not need the cooling device, and accordingly, it is possible to realize simplification of the structure and the light weight. The transportation/storage container using the heat-storage material of the invention is suitably used for transportation of medicines, organs to be implanted, fresh food, and the like which are maintained to be cool in a narrow temperature range and need to be transported at a constant temperature.

Example 5

Figure 12:
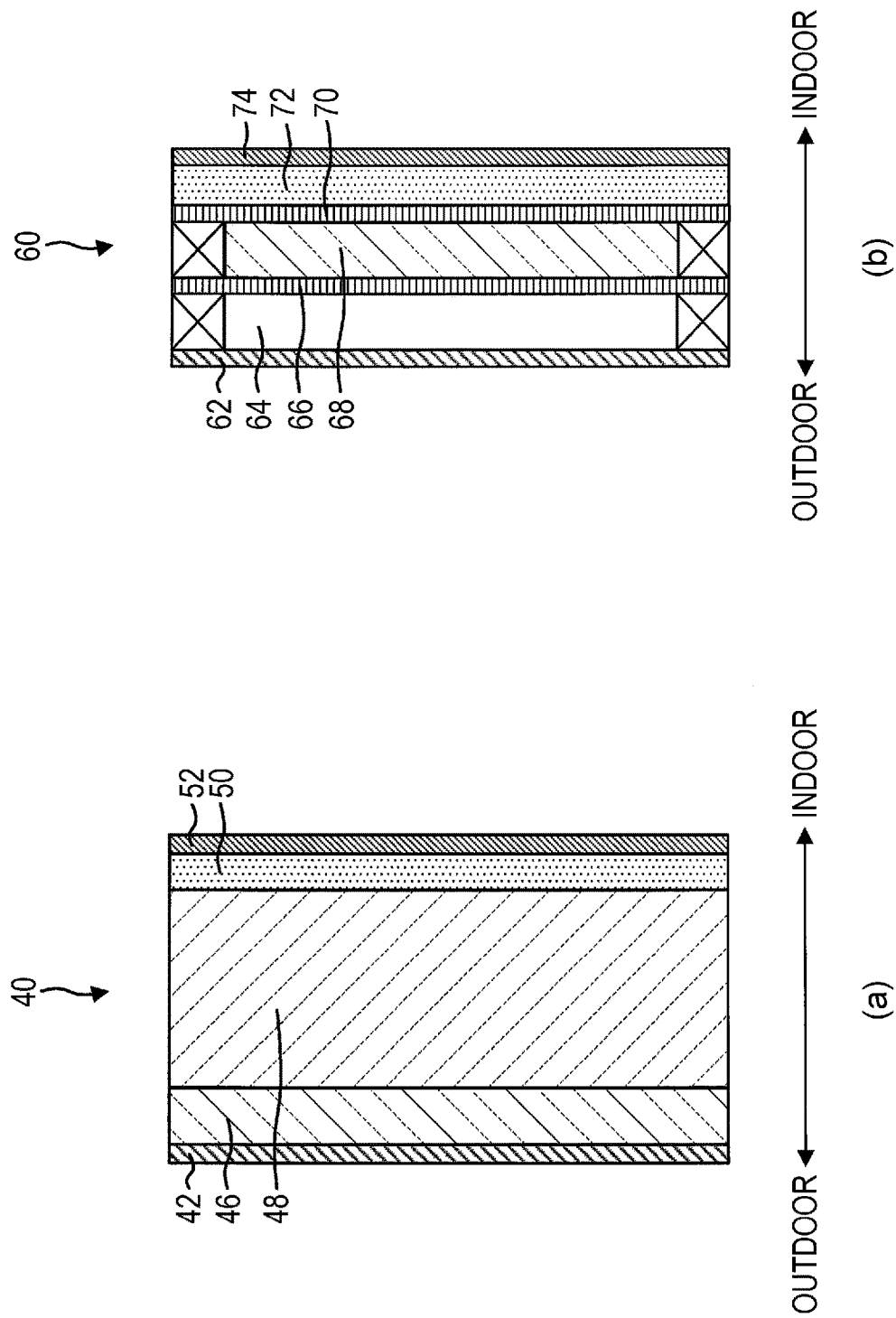
FIG. 12 is a sectional view of a heat-storage wall 40 and a heat-storage wall 60 according to Example 5 of the embodiment of the invention.

Next, heat-storage wall members as a construction material using the heat-storage material of the invention will be described with reference to FIG. 12. FIG. 12 includes sectional views of heat-storage wall members 40 and 60 according to Example 5 of the embodiment. Two-way arrows shown in FIG. 12 indicate an outdoor direction and an indoor direction in a case where the heat-storage wall members 40 and 60 of this example are installed in an architectural structure. The heat-storage material of the invention can be used as a construction material for walls of a house.

FIG. 12(a) is a sectional view of the heat-storage wall member 40 used in a house constructed by reinforced concrete (RC). The heat-storage wall member 40 includes a siding 42 (a thickness of approximately 9 mm), a heat-insulating material 46 (a thickness of approximately 30 mm), concrete 48 (a thickness of approximately 100 mm to 200 mm), a heat-storage member 50 (a thickness of approximately 5 mm to 10 mm), and a plaster board 52 (a thickness of approximately 12 mm) which are arranged in this order from the outdoor side to the indoor side. As the heat-storage member 50, $[(n-C_4H_9)_4]_2HPO_4$ (phase change temperature: 17.2° C.) can be used, for heating, for example, and $(i-C_5H_{11})_4NCl$ (phase change temperature: 29.8° C.) can be used, for cooling, for example, in addition to any of the heat-storage materials of Examples 1 to 3. A fibrous heat-insulating material such as glass wool is used as the heat-insulating material 46.

FIG. 12(b) is a sectional view of the heat-storage wall member 60 used in a wooden house. The heat-storage wall member 60 includes a siding 62 (a thickness of approximately 9 mm), an air layer 64 (a thickness of approximately 30 mm), a sheet of plywood 66 (a thickness of approximately 12 mm), a heat-insulating material 68 (a thickness of approximately 30 mm), a sheet of plywood 70 (a thickness of approximately 12 mm), a heat-storage member 72 (a thickness of approximately 5 mm to 10 mm), and a plaster board 74 (a thickness of approximately 12 mm) which are arranged in this order from the outdoor side to the indoor side. As the heat-storage member 72, $[(n-C_4H_9)_4N]_2HPO_4$ (phase change temperature: 17.2° C.) can be used, for heating, for example, and $(i-C_5H_{11})_4NCl$ (phase change temperature: 29.8° C.) can be used, for cooling, for example, in addition to any of the heat-storage materials of Examples 1 to 3. A fibrous heat-insulating material such as glass wool is used as the heat-insulating material 68.

In a case of using the heat-storage material of the invention in the heat-storage member 50 or the heat-storage member 72, a hard container such as a polyethylene blow-molding container may be filled with the heat-storage material as it is, but it is desirable that the heat-storage material of the invention is gelated or thickened and fills a hard container such as the polyethylene blow-molding container, in order to suppress the nucleus growth at the time of a phase change of the heat-storage material, to prevent a deterioration in surface flatness at the time of solidification of the heat-storage material, or to prevent leakage of the heat-storage material at the time of the container being damaged. In a case where it is possible to suppress fluidity in a state of liquid phase by gelating the heat-storage material of the invention, the container is not necessarily a hard container, but a pack of the sealed resin film may be used as a container.

In the same manner as in Example 4, it is effective to arrange the heat-storage member on the further indoor side than the heat-insulating material, in order to maintain the temperature in the chamber at a constant temperature for a long period of time. This is because the heat-storage member may only need to absorb the decreased amount of heat, since it is possible to decrease the flowing of heat from the outdoor side to the indoor side by the heat-insulating material. In addition, in a case of using the heat-storage member in a wall member, it is necessary that the heat-storage member stores heat of an air conditioner in the indoor, and accordingly, it is desired that the heat resistance between indoor air and the heat-storage member is decreased as much as possible. Accordingly, the heat-storage member may be provided on the further indoor side than the plaster board, depending on the indoor usage purpose or environment.

The heat-storage wall members 40 and 60 as the construction materials according to this example include any of the heat-storage materials of Examples 1 to 5. The heat-storage wall members 40 and 60 according to this example cause a change in temperature of the living space to be slow, and it is possible to improve comfortability of the living space.

Example 6

Figure 13:
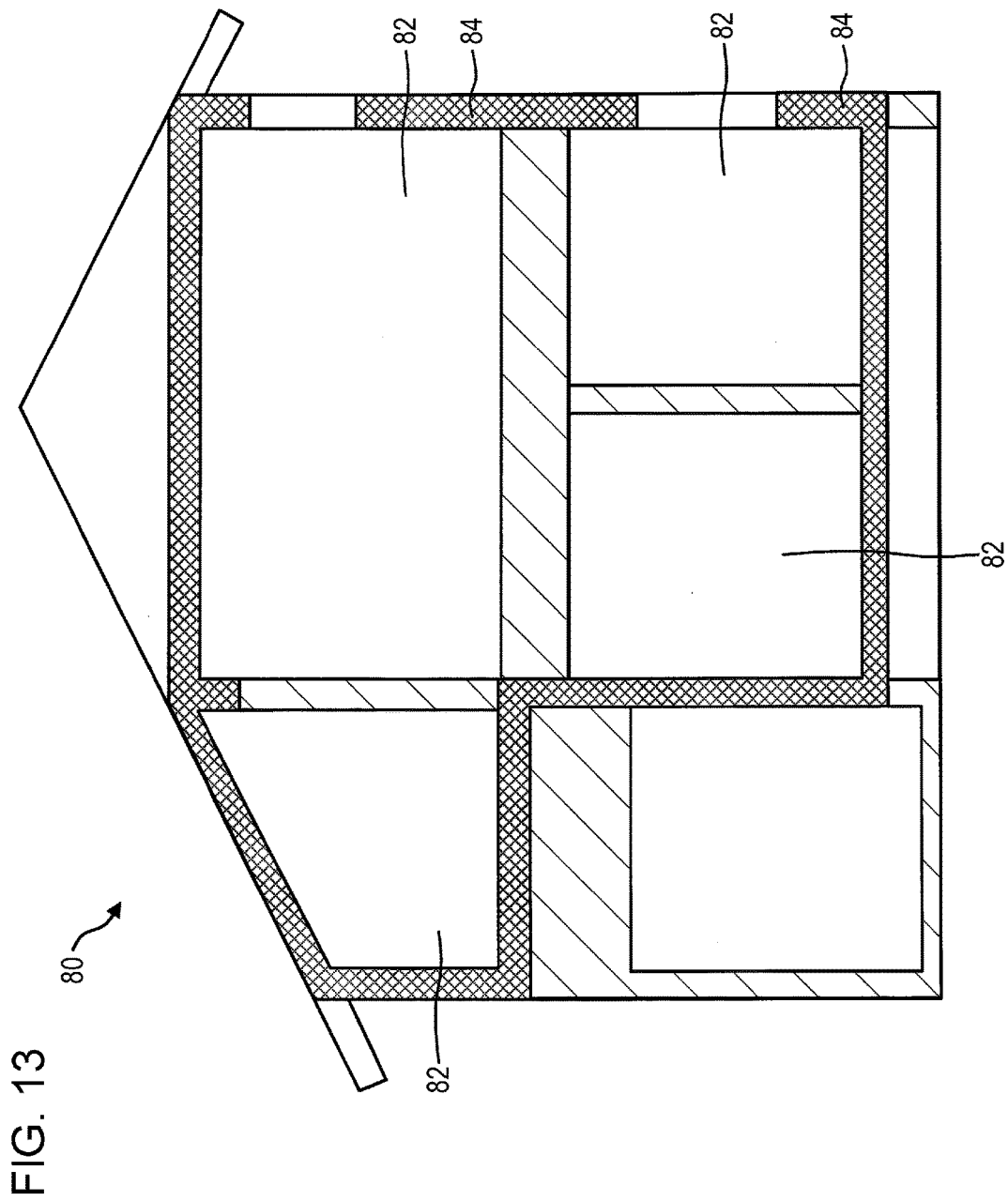
FIG. 13 is a schematic sectional view of a house 80 according to Example 6 of the embodiment of the invention.

A house 80 as an architectural structure using the heat-storage material of the invention will be described with reference to FIG. 13. FIG. 13 is a schematic sectional view of the house 80 as an architectural structure according to Example 6 of the embodiment. The heat-storage wall members 40 and 60 shown in FIG. 12 are used in the house 80.

As shown in FIG. 13, the house 80 according to this example includes a two-storied structure. The house 80 includes a plurality of (for example, three) living spaces 82 and a heat-storage wall member 84. In a case where the house 80 is RC-constructed, the heat-storage wall member 40 shown in FIG. 12(a) is used as the heat-storage wall member 84. In addition, in a case where the house 80 is a wooden house, the heat-storage wall member 60 shown in FIG. 12(b) is used as the heat-storage wall member 84. As shown in FIG. 13, the heat-storage wall member 84 is desirably provided in regions among walls, floors, or ceilings of the house where the amount of heat transmission is great.

The house 80 as the architectural structure according to this example includes the heat-storage wall members 40 and 60 of Example 5. The house 80 according to this example causes a change in temperature of the living spaces to be slow, and it is possible to improve comfortability of the living spaces.

The invention is not limited to the embodiments described above and can be modified in various manner.

In the embodiments, the example has been used in which potassium alum dodecahydrate or ammonium alum dodecahydrate are used as the supercooling preventing agent, but the invention is not limited thereto, and an anhydride of potassium alum or an anhydride of ammonium alum can be used as the supercooling preventing agent.

The matters disclosed in the detailed descriptions, particularly, the matters described in the embodiments can be combined with each other.

INDUSTRIAL APPLICABILITY

The invention can be widely used in fields of heat-storage members using heat-storage materials, and storage containers, transportation/storage containers, construction materials, and architectural structures using the same.

The invention claimed is:

1. A heat-storage material comprising:
   a heat-storage substance which reversibly changes between an aqueous solution containing tetrabutylammonium bromide and a clathrate hydrate containing the tetrabutylammonium bromide as a guest molecule; and
   potassium alum dodecahydrate which is added to the aqueous solution, wherein
   a concentration of the tetrabutylammonium bromide in the aqueous solution is approximately 25 wt % or more and 40 wt % or less, and
   a concentration of the potassium alum dodecahydrate in the aqueous solution is 2.5 wt % or more and 4.0 wt % or less.

2. A heat-storage material comprising:
   a heat-storage substance which reversibly changes between an aqueous solution containing tetrabutylammonium bromide and a clathrate hydrate containing the tetrabutylammonium bromide as a guest molecule;
   ammonium alum dodecahydrate which is added to the aqueous solution; and
   a poor solvent for the ammonium alum dodecahydrate, which is added to the aqueous solution, wherein
   a concentration of the tetrabutylammonium bromide in the aqueous solution is approximately 25 wt % or more and 40 wt % or less, and
   a concentration of the ammonium alum dodecahydrate in the aqueous solution is equal to or more than 2 wt %.

3. The heat-storage material according to claim 2, wherein the poor solvent is methanol, ethanol, 1-propanol, 2-propanol, tert-butyl alcohol, or acetone.

4. The heat-storage material according to claim 3, wherein the concentration of the 2-propanol in the aqueous solution is 1.5 wt % or more and 3 wt % or less.

5. The heat-storage material according to claim 1, wherein the pH of the aqueous solution is approximately 6.

6. A storage container comprising:
   a storage chamber which stores storage materials;
   a heat source for maintaining a temperature in the storage chamber at a predetermined temperature; and
   a heat-storage member which is disposed for absorbing heat flowing into the storage chamber and in which the heat-storage material according to claim 1 is used.

7. A transportation/storage container in which the heat-storage material according to claim 1 is used.

8. A construction material in which the heat-storage material according to claim 1 is used.

9. An architectural structure comprising the construction material according to claim 8.

10. The heat-storage material according to claim 2, wherein the pH of the aqueous solution is approximately 6.

11. A storage container comprising:
    a storage chamber which stores storage materials;
    a heat source for maintaining a temperature in the storage chamber at a predetermined temperature; and
    a heat-storage member which is disposed for absorbing heat flowing into the storage chamber and in which the heat-storage material according to claim 2 is used.

12. A transportation/storage container in which the heat-storage material according to claim 2 is used.

13. A construction material in which the heat-storage material according to claim 2 is used.

14. An architectural structure comprising the construction material according to claim 13.

* * * * *